(12) United States Patent
Murthy et al.

(10) Patent No.: US 10,860,451 B1
(45) Date of Patent: Dec. 8, 2020

(54) SYSTEMS AND METHODS FOR PREDICTING AND PREVENTING COMPUTING SYSTEM ISSUES

(71) Applicant: FMR LLC, Boston, MA (US)

(72) Inventors: Bhanu Prashanthi Murthy, Bangalore (IN); Sajith Kumar Vadakaraveedu, Bangalore (IN); Prashanth Bottangada Machaiah, Bangalore (IN); Aanchal Gupta, Bangalore (IN); M. Karthik Kumar, Siruseri (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/779,079

(22) Filed: Jan. 31, 2020

(51) Int. Cl.
  *G06F 11/30* (2006.01)
  *G06K 9/62* (2006.01)
  *G06F 16/17* (2019.01)
  *G06F 11/07* (2006.01)

(52) U.S. Cl.
  CPC ........ *G06F 11/3075* (2013.01); *G06F 11/076* (2013.01); *G06F 11/3006* (2013.01); *G06F 11/3068* (2013.01); *G06F 16/1734* (2019.01); *G06K 9/6257* (2013.01); *G06K 9/6278* (2013.01)

(58) Field of Classification Search
  CPC ............. G06F 11/0712; G06F 11/0751; G06F 11/0775; G06F 11/0781; G06F 11/0709; G06F 11/0748; G06F 11/3006; G06F 11/3055
  See application file for complete search history.

(56) References Cited

U.S. PATENT DOCUMENTS

| | | | |
|---|---|---|---|
| 5,463,768 A * | 10/1995 | Cuddihy | G06F 11/2205 714/37 |
| 7,796,528 B2 * | 9/2010 | Yoshizawa | G06F 11/0748 370/242 |
| 10,027,534 B1 | 7/2018 | Mahapatra et al. | |
| 10,146,609 B1 | 12/2018 | Leverich et al. | |
| 2009/0234908 A1 * | 9/2009 | Reyhner | G06F 9/546 709/203 |
| 2017/0031742 A1 | 2/2017 | Jilani | |
| 2018/0020015 A1 | 1/2018 | Munro et al. | |
| 2018/0165147 A1 * | 6/2018 | Debnath | G06F 11/0766 |
| 2018/0307740 A1 * | 10/2018 | Zhou | G06F 16/24568 |
| 2019/0065343 A1 * | 2/2019 | Li | G06F 11/0766 |

(Continued)

*Primary Examiner* — Nadeem Iqbal
(74) *Attorney, Agent, or Firm* — Proskauer Rose LLP

(57) ABSTRACT

Systems and methods for predicting computing system issues include: receiving a set of incident management tickets for a set of computing system issues and a set of computer log files for multiple modules of the computing system; arranging the set of tickets into chronologically ordered groups associated with particular computing system issues; pre-processing the set of computer log files to remove specified information, append to each log entry an indicator of the module of the log file, and merge the log entries; determining for each group a set of patterns for the group's associated computing system issue before the group's associated computing system issue arises; calculating for each pattern in each group a similarity score; selecting a subset of patterns whose similarity scores exceed a specified threshold; and generating a computing model associating the subset of patterns in each group with the group's associated computing system issue.

30 Claims, 12 Drawing Sheets

(56) References Cited

U.S. PATENT DOCUMENTS

2019/0102244 A1* 4/2019 Tarlano .................. G06F 9/542
2020/0073741 A1* 3/2020 Wang .................... G06F 11/079
2020/0076538 A1* 3/2020 Soultan ............... H04L 41/5019

* cited by examiner

SYSTEMS AND METHODS FOR PREDICTING AND PREVENTING COMPUTING SYSTEM ISSUES

TECHNICAL FIELD

This application relates generally to systems, methods and apparatuses, including computer programs, for predicting and preventing computing system issues in real time. More specifically, this application relates to using historical computer log data for multiple computing system modules to predict and prevent issues across the computing system.

BACKGROUND

Today's distributed computing systems are increasingly complex and can include large numbers of interconnected and interdependent computing modules (e.g., computing devices, network layers, software applications, databases, etc.). In such complex systems, it can quickly become difficult to trace, predict and prevent computing system issues. For example, it is not always clear which computing module originated an error, or if an error in one computing module triggered a series of events leading to errors in other computing modules. Traditionally, log files for individual computing modules have tracked data to enable human reviewers to understand the sources of computing errors, either through manual analysis or automated means. However, progress in understanding how the interdependency between computing modules (and/or different network layers) gives rise to computing errors has been limited.

The difficulty of tracking such information is compounded by a number of factors. First, standards of logging are different across different applications, as well as separate tools used by those applications. Second, logs are often in an encoded format (e.g., a database server system log is typically encoded) and are thus not easily read by human users. Third, systems are becoming not only more complex but more dynamic and quick to evolve over time. As a result, establishing meaningful correlations between the information available and the effects observed can be strenuous and time consuming. To identify and automate such detection in real time (or near real time) is nearly impossible by manual or other traditional analysis, and has to date proven elusive.

SUMMARY

Accordingly, the invention provides a framework, including computing systems, software, and associated computing methods and modules, for predicting and preventing errors and/or issues in computing systems having two or more interconnected modules or components. Artificial intelligence (AI) and/or machine learning (ML) methods are leveraged to relate computer logs for different computing modules in a superstructure (e.g., a meta-model), that can: (i) help predict issues occurring in the larger system; (ii) alert a user if an issue is likely to arise; and/or (iii) preempt issues before they arise. The meta-model can be trained on historical data and deployed in real time to process incoming log data from multiple computing modules to detect issues in the larger computing system. In doing so, an end-to-end dependency can be established between logs of the various computing modules. In addition, multiple formats for representing log data can be accommodated by strategic pre-processing of log data (e.g., feature extraction and/or removal of unneeded data), and pre-processed data can be stored in repositories that can be periodically updated as better data becomes available. Using such systems and methods, impact can be assessed when upstream data values change or when network traffic changes.

In one typical use scenario, the invention uses a log meta-model implemented on a computing device. The log meta-model can be a data model that caters to any type of log data source and can be implemented as a "plug and play" model over different types of logs as metadata sources. The computing device can employ a number of advantageous features, including time slicing and bucketing, pattern extraction and correlation, and pattern matching and prediction. Using time slicing and bucketing, data can be sorted independently of format and/or nature of the logs and incident management tickets. Using pattern extraction and correlation, tagging and identifying specific network layers that cause particular issues can be made easier, and dependency between applications based on usage of physical systems can be uncovered. Using pattern matching and prediction, after the initial system is trained, a feedback mechanism can help improve pattern recognition and issue prediction over time.

In one aspect, the invention features a method of training a computing device to predict and/or prevent computing system issues. The method includes receiving, by the computing device, a set of incident management tickets for a set of computing system issues. The method also includes arranging, by the computing device, the set of incident management tickets into groups, each group associated with a particular computing system issue in the set of computing system issues and including a subset of the incident management tickets ordered chronologically. The method also includes receiving, by the computing device, a set of computer log files for multiple modules of the computing system. The method also includes pre-processing, by the computing device, the set of computer log files to remove specified information, append to each log entry an indicator of the module of the log file, and merge the log entries, thereby generating a pre-processed computer log record. The method also includes determining, by the computing device, for each group, a set of patterns in log entries of the pre-processed computer log record for the group's associated computing system issue during a specified time interval before the group's associated computing system issue arises. The method also includes calculating, by the computing device, for each pattern in each group, a similarity score. The method also includes selecting, by the computing device, from the set of patterns in each group, a subset of patterns whose similarity scores exceed a specified threshold. The method also includes generating, by the computing device, a computing model associating the subset of patterns in each group with the group's associated computing system issue.

In some embodiments, the method includes storing, by the computing device, the computing model including the patterns in each group in a database in electronic communication with the computing device. In some embodiments, the computing model includes at least one of structured features from the log files, meta information from the log files, and trained data set information for one or more types of computing system issues. In some embodiments, the computer log files are heterogeneous and include unstructured data. In some embodiments, the multiple modules of the computing system include a database having an associated database log, a network having an associated network log, and an application having an associated application log.

In some embodiments, pre-processing the set of computer log files to remove specified information includes removing special characters. In some embodiments, determining each pattern in the set of patterns includes using a KNN algorithm, a naïve Bayes classifier, a random forest classifier, or another clustering technique. In some embodiments, calculating the similarity score includes using a KNN algorithm, a random forest classifier, or a tf-idf classifier followed by cosine similarity. In some embodiments, calculating the similarity score includes using a competitor and challenger model. In some embodiments, the method includes incorporating, by the computing device, feedback regarding incident management ticket closure into the computing model to improve pattern recognition by the computing model. In some embodiments, the incident management tickets are received from an incident ticketing system (e.g., service now) database.

In some embodiments, determining the set of patterns for each group during a specified time interval includes using a combination of time slicing and windowing techniques, the computing device: (i) executing the computing model for a number of combinations of different time slices and windows; (ii) computing an accuracy percentage for each combination; and/or (iii) selecting the combination having the highest accuracy defined by combinations selected based on a highest match in matrix that has maximum similarity score and highest features matching. In some embodiments, the specified time interval is between 5 and 90 minutes. In some embodiments, the method includes (i) receiving, by the computing device, real time log streaming data; and/or (ii) labeling, by the computing device, each log entry with an indicator of the layer of the log to apply the computing model to predict a real-time issue. In some embodiments, the specified threshold for similarity scores is between 80% and 90%. In some embodiments, the specified threshold for similarity scores is user defined and/or is system computed.

In another aspect, the invention features a method of predicting and/or preventing computing system issues in real time. The method includes receiving, by a computing device, in real time, a set of computer log file data streams, each computer log file data stream associated with a different module of a computing system. The method also includes determining, by the computing device, a set of feature similarities between the set of computer log file data streams and a training data set according to known patterns stored in a computing model of the computing device. The method also includes calculating, by the computing device, based on the set of feature similarities, a similarity score. The method also includes generating, by the computing device, based on the similarity score, a prediction of whether a computing system issue will occur based on comparing the set of feature similarities to a specified similarity threshold.

In some embodiments, the method includes generating, by the computing device, a correlation matrix including comparisons between historic computer log patterns of different computing modules and the computer log file data streams. In some embodiments, the method includes determining, by the computing device, how a particular computing module is impacting other computing modules of the computing system using the correlation matrix. In some embodiments, the method includes generating, by the computing device, for any computing system issue that is detected, an incident ticketing system (e.g., service now) incident management ticket. In some embodiments, the method includes refining, by the computing device, the computing model based on eventual resolution of the incident ticketing system incident management ticket. In some embodiments, the method includes identifying, by the computing device, for a new incident management ticket that has not occurred previously, a pattern similar to one or more known patterns stored in the computing model using a clustering method based on the set of feature similarities. In some embodiments, the method includes determining, by the computing device, whether the computing issue is indicative of a false alarm by comparing a similarity score of the new incoming log with existing patterns and if none of the patterns matches above a predetermined threshold it is deemed a safe log.

In another aspect, the invention features a computerized system for training a computing device to predict and/or prevent computing system issues for a computing system having multiple modules. The computerized system includes a computing device. The computing device is configured to receive a set of incident management tickets for a set of computing system issues. The computing device is configured to arrange the set of incident management tickets into groups, each group associated with a particular computing system issue in the set of computing system issues and including a subset of the incident management tickets ordered chronologically. The computing device is configured to receive a set of computer log files for multiple modules of the computing system. The computing device is configured to pre-process the set of computer log files to remove specified information, append to each log entry an indicator of the module of the log file, and merge the log entries, thereby generating a pre-processed computer log record. The computing device is configured to determine, for each group, a set of patterns in all log entries of the pre-processed computer log record for the group's computing system issue during a specified time interval before the group's computing system issue arises. The computing device is configured to calculate, for each pattern in each group, a similarity score. The computing device is configured to select, from the set of patterns in each group, a subset of patterns whose similarities scores exceed a specified threshold. The computing device is configured to generate, a computing model associating the subset of patterns in each group with the computing system issue.

In some embodiments, the system includes a database in electronic communication with the computing device, the database storing the computing model including the patterns in each group. In some embodiments, the system includes an incident ticketing system (e.g., service now) database in electronic communication with the computing device, the incident ticketing system database for providing incident management tickets to the computing device. In some embodiments, the multiple modules of the computing system include a database having an associated database log, a network having an associated network log, and an application having an associated application log.

In another aspect, the invention features computerized system for predicting and/or preventing computing system issues in real time for a computing system having multiple modules. The computerized system includes a computing device. The computing device is configured to receive in real time a set of computer log file data streams, each computer log file data stream associated with a different module of a computing system. The computing device is configured to determine a set of feature similarities between the set of computer log file data streams and a training data set according to known patterns stored in a computing model of the computing device. The computing device is configured to calculate, based on the set of feature similarities, a similarity score. The computing device is configured to generate, based on the similarity score, a prediction of whether a computing system issue will occur based on comparing the set of feature similarities to a specified similarity threshold.

In some embodiments, the system includes a database in electronic communication with the computing device, the database storing the computing model including the patterns in each group. In some embodiments, the system includes an incident ticketing system (e.g., service now) database in electronic communication with the computing device, the incident ticketing system database for providing incident management tickets to the computing device (e.g., for receiving the user feedback in relation to earlier predicted incidents). In some embodiments, the multiple modules of the computing system include a database having an associated database log, a network having an associated network log, and an application having an associated application log.

Thus, the invention provides: new systems and methods for bucketing issues and clustering important predictive features; new ways of log pattern extraction and correlation; new ways of pattern matching and prediction; and a new meta-model to store and look up processed information. In addition, the computing device can self-learn from different data sources and define necessary conditions for identifying multiple types of issue occurrences in the system that have occurred in the past. Data can be collected from heterogeneous sources, e.g., system logs, network log and application logs, as unstructured data, and the invention can be agnostic of log format and issue management ticket content.

The invention therefore provides an easier way for an operations team identify an issue that is about to occur and the nature of the issue (or, alternatively, if it is a false alarm). With an auto-discovering, self-service lineage solution in place, the invention permits operations teams to spend less time researching data entities and assessing impact and hence improves stability and smoothness of business operations. The invention can have numerous uses, including: (1) automatic discovery of the nature of issues and associated patterns within log data and ticket data (regardless of whether both have related information); (2) automatic discovery of relationships among system layers with direct and non-apparent relationships; (3) determination of inter-system impacts and relationships between layers of the system; (4) prediction of system impacts based on real-time log flow; (5) integration and collection of many types of incidents from known heterogeneous sources and stored in relational databases; (6) generation of improved data quality and governance; (7) reduction in analysis and faster time to market; (8) self-healing and auto-correction based on user feedback; and/or (9) providing head room to take necessary actions, either systematically, or in the case that user intervention is needed, in a way that assists the user with the necessary steps. The invention also provides automation of providing system guidance to avoid certain incidents from occurring that require no human intervention (e.g., clearing of temporary space when server alerts are issued based on the threshold). Systems can be programmed to clear temporary space without generating alerts well in advance.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

FIG. 3 is an illustration of text of two computer log files, shown side-by-side, in which a positive match is found, thereby predicting a computing issue is to occur, according to an illustrative embodiment of the invention.

FIG. 4 is an illustration of text of two computer log files, shown side-by-side, in which a negative match is found, thereby not predicting a computing issue is to occur, according to an illustrative embodiment of the invention.

DETAILED DESCRIPTION

Figure 1:
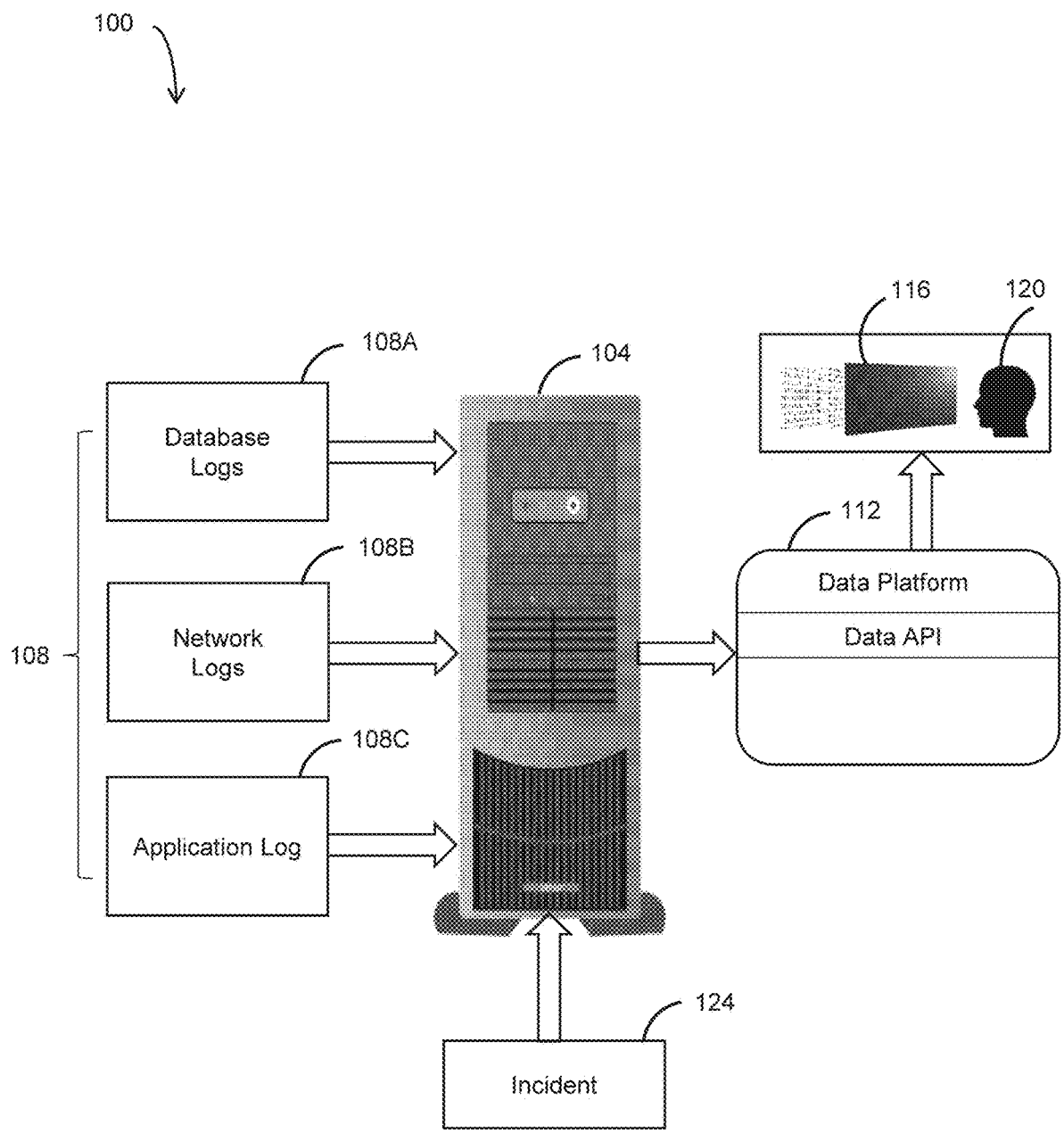
FIG. 1 is a schematic diagram of a computing system having a computing device for predicting computing system issues, according to an illustrative embodiment of the invention.

FIG. 1 is a schematic diagram of a computing system 100 having a computing device 104 for predicting computing system issues, according to an illustrative embodiment of the invention. The computing device 104 can be configured to execute one or more of the processing operations described herein. The computing device 104 is in electronic communication with multiple computer logs 108. In one exemplary embodiment, the computer logs 108 include a database log 108A, a network log 108B, and an application log 108C, although other logs and combinations of logs associated with various computing modules are possible. When the computing device 104 is training, the computer logs 108 can be historic logs. During a prediction operation, the computer logs 108 can be real-time logs.

The computing device 104 receives input from the computer logs 108 and performs processing operations, e.g., as described in detail below, to produce data outputs, which can be stored in the database 112 and ultimately provided to a user interface 116 for viewing and/or analysis by a user or users 120 (e.g., an operations team). When the computing device 104 is training, the data outputs can include a set of patterns that are grouped according to computing system issues that they represent, which can in turn be included in a computing model (e.g., a meta-model) stored in the database 112, which includes a data platform and a data application programming interface (API) displayed on a user interface. When the computing device 104 is predicting computing system issues in real time, the data outputs can include the nature of the issues, resolutions taken in the past for similar issues, and auto-correction in cases where possible. The computing system 100 is also capable of "self-healing", e.g., when a model score for a particular issue is below a specified threshold using similarity scores for features extracted from real time computer log file data streams and/or predictions of whether computing system issues will occur (e.g., as described in greater detail below). During a self-healing or re-training operation, one or more incidents 124 can be provided in real time to the computing device 104, e.g., from an incident ticket system (e.g., service now) database.

Figure 2A:
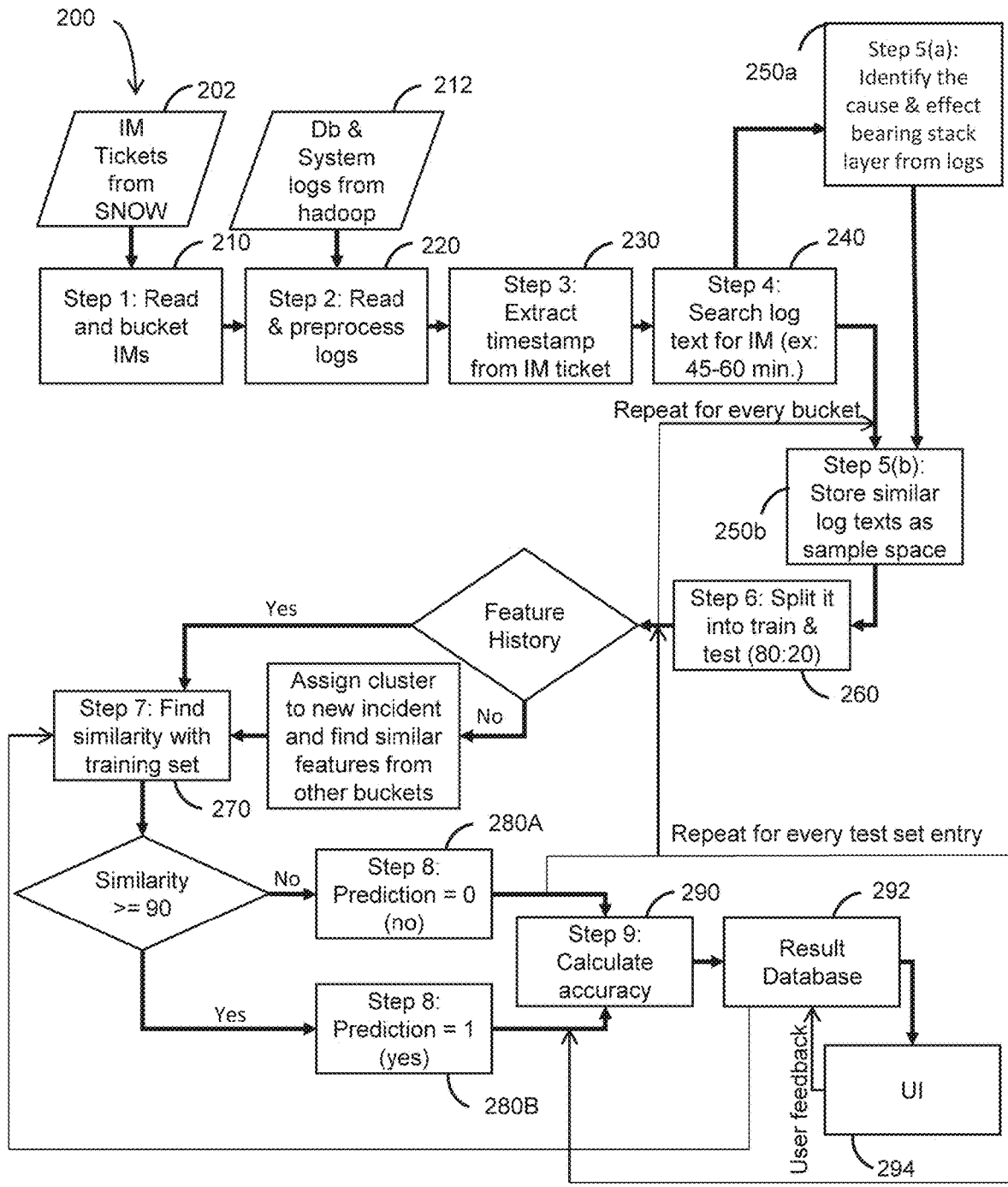
FIG. 2A is an illustration of an exemplary process flow of a computing device during training, according to an illustrative embodiment of the invention.

FIG. 2A is an illustration of an exemplary process flow 200 of a computing device during training, according to an illustrative embodiment of the invention. The steps described below can be implemented in the computing system 100 shown and described above in FIG. 1 (e.g., processing operations can be executed by the computing device 104). During training, data is collected from two or more heterogeneous sources (e.g., application logs, network logs, database logs or trace files, and/or other forms of unstructured data) for a set of computing system issues, processed, and stored in a database (e.g., the database 112 of FIG. 1), and a computing model (e.g., meta-model) is generated to help predict future computing system issues. During a prediction operation, real time log data streams are received and processed, and the computing model is used to predict issues based on the incoming log data. Exemplary details of these methods are expanded upon below.

In a first step 210, a set of incident management tickets 202 is received for a set of computing system issues (e.g., from an incident ticketing system database) that has occurred in past. The tickets 202 can be classified according to the nature of issue that occurred. The tickets 202 can then be arranged into groups (or "buckets"), with each group associated with a particular computing system issue, and the tickets within groups ordered chronologically. Buckets corresponding to particular issues can be defined using short descriptions, e.g., "fileAlerts, Pluggable database, etc." and issues can be sorted according to chronological order. For each bucket, the date and time of the issue can be identified, and a list of times can be made (e.g., within the same day and across days).

In a second step 220, a set of computer log files 212, again from history for the date range corresponding to the date ranges of issues, can be received for multiple modules of the computing system (e.g., a database log, a network log, and a system log). The set of computer log files 212 can be pre-processed to remove specified information (e.g., special characters and other information deemed to be unnecessary, such as special characters, stop words, and/or a list of user-defined elimination details). The particular information to be removed can be specified in a log meta-model, which can be a part of the larger meta-model (e.g., as described in greater detail below in FIGS. 9A and 9B). For each line in a particular log, an identifier or the log type (labeling of the log) can be appended, e.g., the keyword DATABASE or NETWORK or SYSTEM. Then, all entries coming from these different logs can be merged, and the merged file can be sorted by time stamp, with the result being a pre-processed computer log record reflecting multiple log entries all sorted by timestamp. The labeling and sorting by time can help to build a correlation between layers of the multi-tiered system architecture, build the cause-and-effect relationship for the incidents in the past, and/or predict future incidents in real time.

In a third step 230, date and/or timestamp information can be extracted from each ticket. Since there may or may not be a textual similarity between incident tickets and the associated log information, time slicing along with a time window helps establish a correlation of cause and effect between the tickets and the associated log entries. This approach is agnostic of the type of the file and the commonalities or differences between the various computing logs of the system. Particularly in heterogeneous setups, date and time stamps can become an important guidepost in uncovering the cause of an issue.

In one exemplary implementation, for a given date, the system considers all relevant logs (e.g., system, network and application). For a given time in the incident, the system picks the patterns established within each log for a particular time range (e.g., 45 minutes) before the incident time. A combination of time slice and window matrix is used in executing this step. For example, the time slice can be in "hops" of a specified increment (e.g., 5, 10, 15, or 20 minutes) arranged in a table, and the hops can be changed using data. For example, as a part of the self-healing process, the system can determine that other than standard hops of 5 or 10 minutes, a time slice of 8 minutes provides better control of determining the issues. The system can treat this as a new time slice to be considered. Default hops of 5 minutes can be seeded during the module installation, and other values can be system-determined and entered by the system for making the module efficient during training. The windowing concept can also be in terms of a specified increment before the incident occurred (e.g., 60, 45, 30 or 15 minutes). Windowing can be determined with respect to each specific type of incident. Windowing can be defined as the time in the past from the time of incident for which the slice of log information is considered. The best combination of the time slice and windowing for which the model has the highest confidence and accuracy can be used as the markup for the selected type of issue.

A 2×2 matrix can then be created with a combination of time slice and window parameters. In order to arrive at the right window for which log patterns are extracted, the computing device can execute the model for different windows and time slices using the guidance included in the metadata table. Accuracy and/or similarity scores can be computed for different windows, and the time slice that has the highest number of feature matches and is followed by an accurate prediction along with the similarity score can be chosen as the time slice for the given application, network and system logs. In order to obtain the best results, this above approach can be executed for different windows, and the best percentage (e.g., for each group of incidents) can be picked as the time interval before which the issue is best predicted.

In a fourth step 240, the computing device searches for log text associated with relevant tickets. This activity can be done in parallel for different time slices and window slices. For this activity, from the time that a particular incident occurred back to 24 hours to 48 hours beforehand, the log entries are scanned for different occurrences of the incident, and a pattern is extracted for the window and time slice. Then a pattern comparison and a feature extraction are performed. The piece of log for which the features extracted are maximum with the highest similarity score is considered as a required pattern to generate the incident. This pattern is extracted during the training of the module for further processing.

In a fifth step part (a) 250a, a "cause and effect" bearing stack layer from the logs is identified. For example, if the issue detected was in an application layer based on the analysis and algorithm output, it can indicate the cause as a database layer. In other words, the issue that occurred can be determined not to be due to the application, but to the operation that was conducted some time before in the database. This way a relationship between different layers can be established for every issue.

In a fifth step part (b) 250b, similar log texts are stored as a sample space. All entries for a specific incident type across the time spans for the given window can be selected to establish a similarity score. For example, the time slice can be selected as 45 minutes before a type of issue under consideration occurs, and the window can be selected as 15 minutes of log content beginning from the time slice starting point. Then, all patterns that have a match greater than or equal to a particular established percentage can be selected, and a correlation can be established for the patterns between layers using networking models. The percentage for the selection of pattern and other details can be driven by the meta-model, e.g., including the window slicing and time slicing of the information.

In a sixth step 260, the above data can be stored as a training data set for the incidents in a defined generic data model, e.g., the log meta model discussed above. This step can be a continual step applied for the training data set, for example to be split 80/20:80% of the data can be used for generating the pattern and 20% of the historical data can be used for validating the generated pattern and refining before applying it to the real time data. In some embodiments, an algorithm randomly chooses the 80% training set and the 20% test set. In some embodiments, other suitable percentage splits are used (e.g., 70% and 30%).

In a seventh step 270, the computing device receives real time log data, looks for patterns and considers a pattern as an issue if it finds match of more than a certain predetermined threshold, e.g., 90%. For a given new rolling window, for data that is flowing inward, the model is executed, and any detection of an issue is registered as an incident ticketing system (e.g., service now) ticket with the user as "EnginePNP". Based on the solution of how the ticket was closed, the information is used by the engine to refine the model. This can be done using the self-healing mechanism. In addition, when the cutoff percentage falls below the threshold or the number of false positives moves above the defined threshold, retraining of the module can be triggered. For a new ticket that did not occur before previously, clustering can be performed to identify a similar pattern using the previously extracted and stored features for similar types of incidents extracted using clustering.

In an eighth step 280, a prediction is made for the real time stream data compared with the training data set in real time to see if there is any pattern match for the specified window. If there is match greater than the predetermined threshold, then it will be identified as incident (step 280A; if not, 280B and prediction=0). In such a case, an alert can be created, with the nature of incident and the possible resolutions taken in the past and the applications impacted. Incidents with a minimum or no history feature comparison are done after clustering for identifying a similar feature set. The feature set is then used for storing as trained data, and the feature set comparison is used to predict the possibility of an issue. In some embodiments, user feedback is also added to refine the model to improve the prediction rate. User feedback need not be manual; each time an incident is predicted a system ticket is created and can be closed by the system user. The computing device can then know whether or not the pattern resulted in an issue based on whether or not an action was taken.

In a ninth step 290, a methodology of a correlation between applications is determined in order to help make the system make predictions well in advance of issues occurring. As indicated above, this is a representation of the methodology rather than the step itself. Once the history is built, a new method can be deployed to identify how each application is impacting the others based on the correlation matrix. The correlation matrix is built using the issues that occurred between applications sharing the server during a given period of the day and defining the predecessor and successor applications for the type of ticket. Using this correlation can make it easier to predict the issue even before the successor system starts to show the relevant pattern. Calculated results can be stored in result database 292 and ultimately provided to User Interface (UI) 294 for viewing by a user.

The meta model described above can be a generic model defined to store the meta information and the trained data set information for each time a new type of issue occurs in an organization. The meta model can help store the features and the content extracted to avoid storing the bulk of logs and helping read the information in a structured manner. The meta model can be designed to cater to any kind of input logs and can be a "plug-and-play" module, as connectors are built for different log formats. This model is data source-agnostic and can automatically scale to store the metadata information. An exemplary definition of a meta model is shown below in FIGS. 9A and 9B.

Figure 2B:
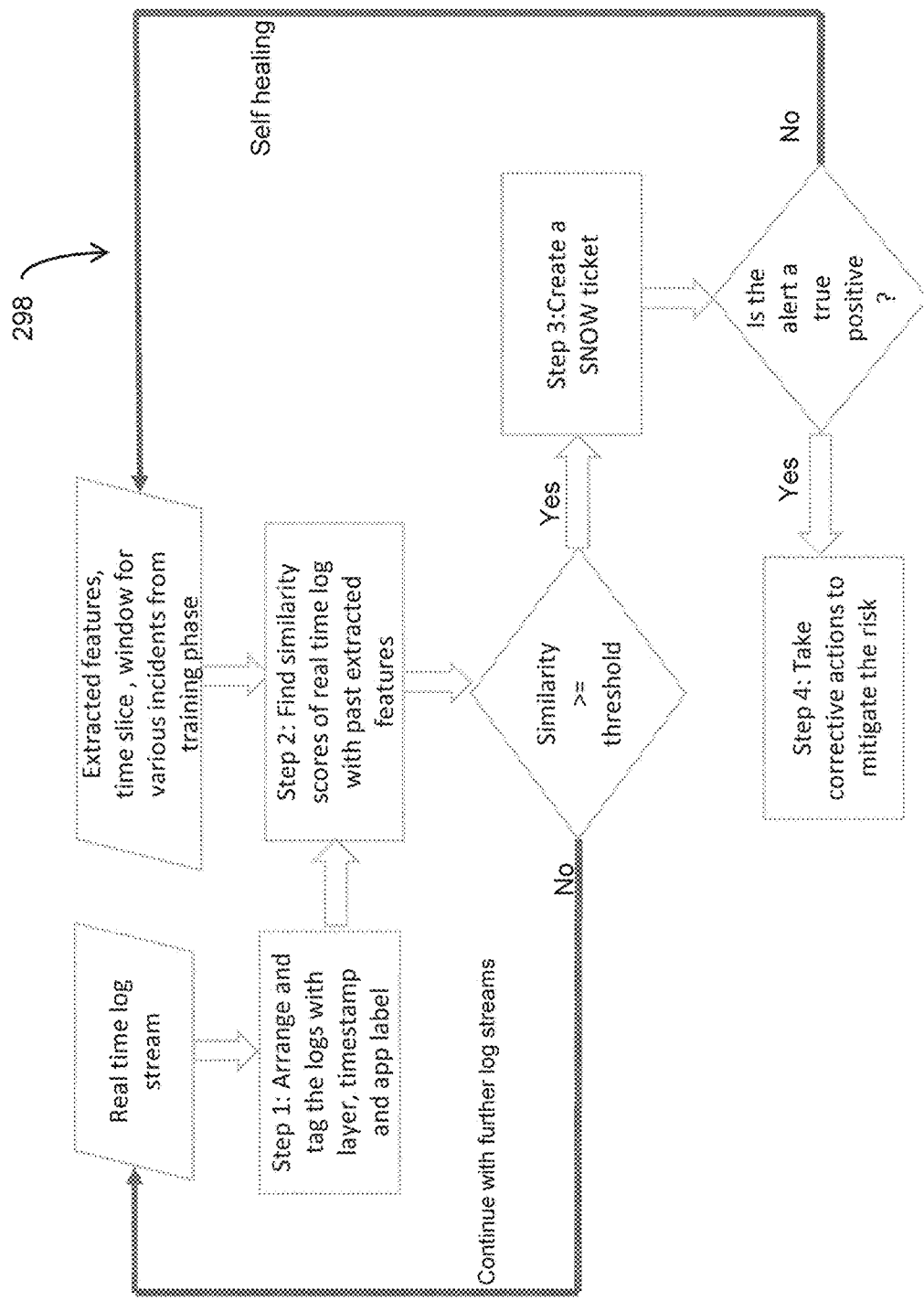
FIG. 2B is an illustration of an exemplary process flow of a computing device during real time operation, according to an illustrative embodiment of the invention.

FIG. 2B is an illustration of an exemplary process flow 298 of a computing device during real time operation (e.g., using the trained patterns determined according to the process shown in FIG. 2A), according to an illustrative embodiment of the invention. In a first step, a real time log stream is received, and the log is arranged and tagged with layer, timestamp and app label information. In a second step, the similarity scores of real time logs having past extracted features are found. For any similarity scores that are greater than or equal to a predefined threshold, an incident management (e.g., service now) ticket is created. For any alert that is a true positive, corrective actions can be taken to mitigate the risk.

Figure 3:
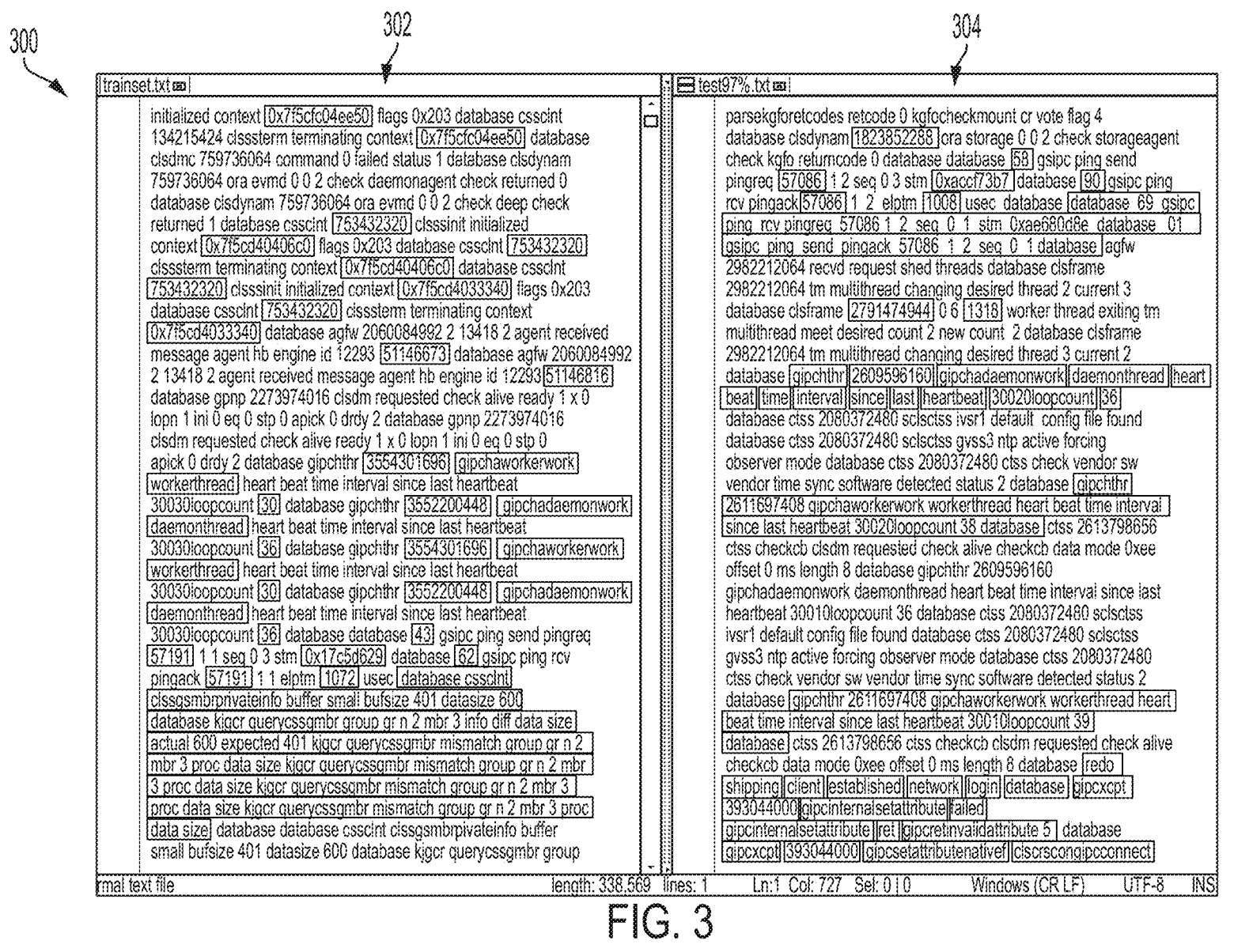

FIG. 3 is an illustration 300 of text of two computer log files 302, 304, shown side-by-side, in which a positive match is found, thereby predicting a computing issue is to occur, according to an illustrative embodiment of the invention. The computer log file 302 on the left is a training file integrated into the meta-model, and the computer log file 304 on the right is a real-time file on which the model is operating. Text is compared in real time according to the algorithms described above. If a textual match is determined to exist above a specified threshold (e.g., 90%) with respect to the analyzed features, a positive match is reported, and it can be inferred that a similar issue is likely about to occur soon in the system. In FIG. 3, matching text is shown with highlighting, and non-matching text is shown by an absence of highlighting.

Figure 4:
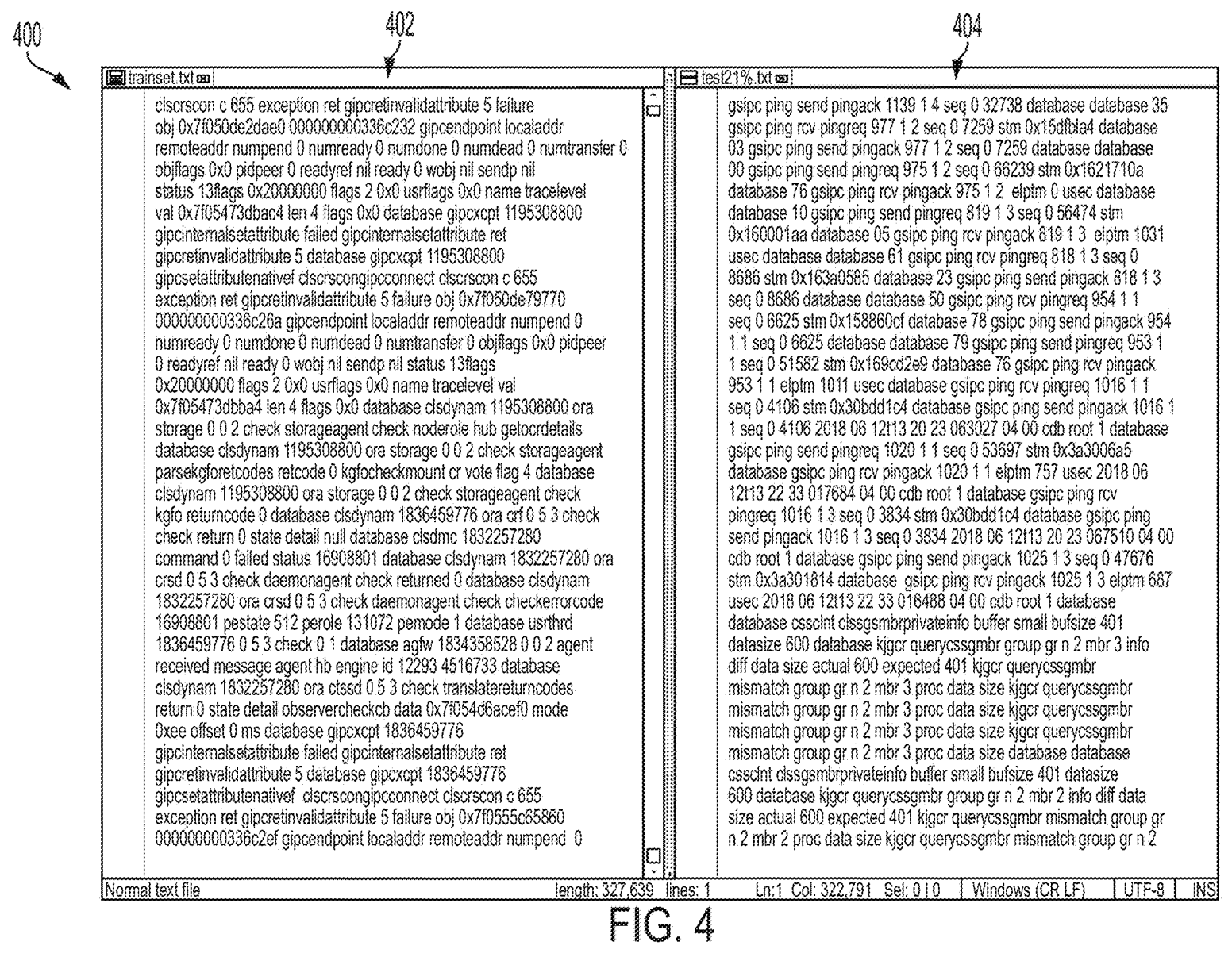

FIG. 4 is an illustration 400 of text of two computer log files 402, 404, shown side-by-side, in which a negative match is found, thereby not predicting a computing issue is to occur, according to an illustrative embodiment of the invention. Similar to FIG. 3 above, the computer log file 402 on the left is a training file integrated into the meta-model, and the computer log file 404 on the right is a real-time file on which the model is operating. Text is compared in real time according to the algorithms described above. If a textual match is determined not to exist above a specified threshold (e.g., 90%) with respect to the analyzed features, a negative match is reported, and it can be inferred that a similar issue is not likely to occur soon in the system. In FIG. 3, matching text is shown with highlighting, and non-matching text is shown by an absence of highlighting.

Figure 5A:
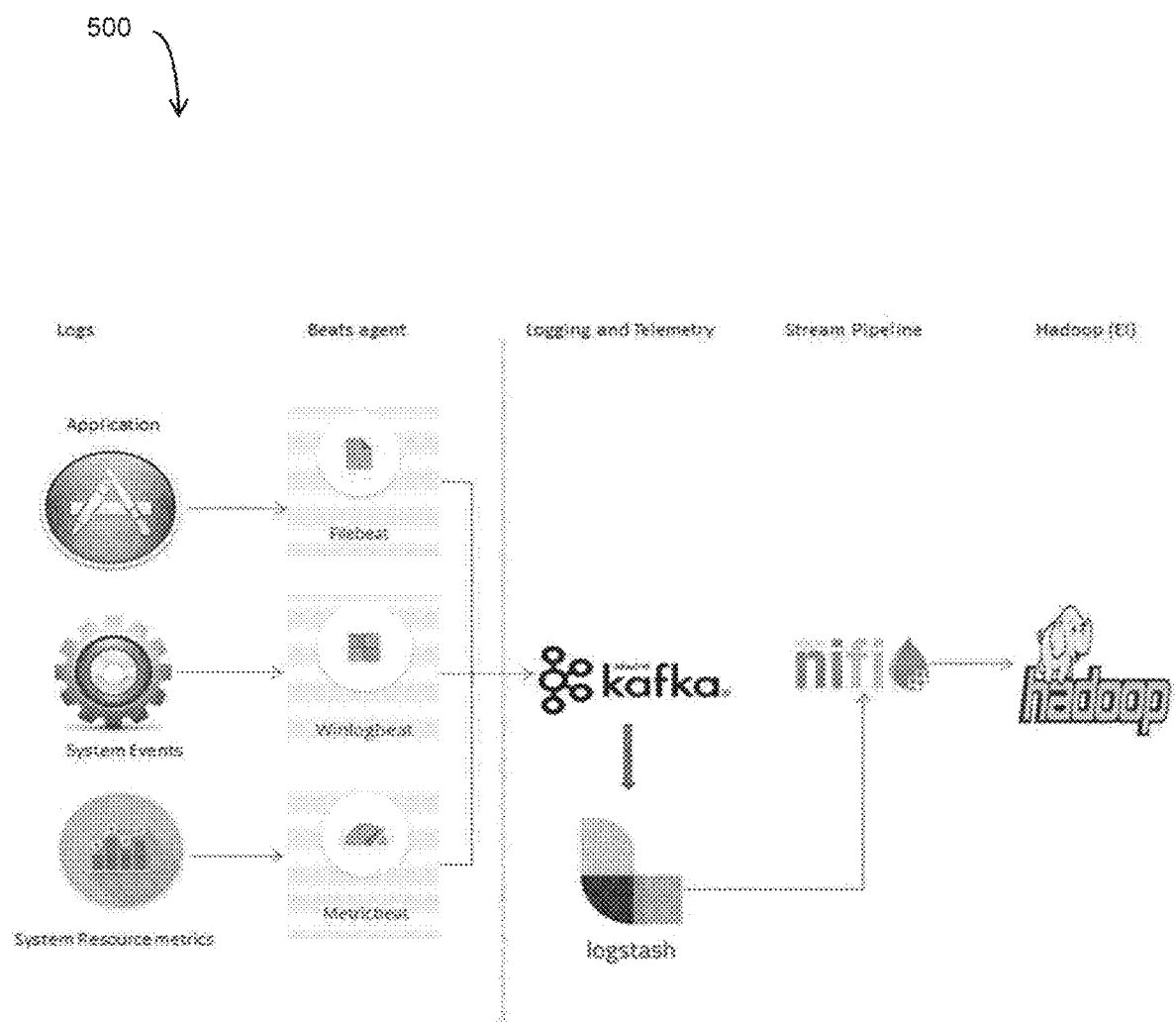
FIGS. 5A and 5B are schematic diagrams of real time data flows through various components of the computing system shown and described in FIG. 1, according to illustrative embodiments of the invention.
Figure 5B:
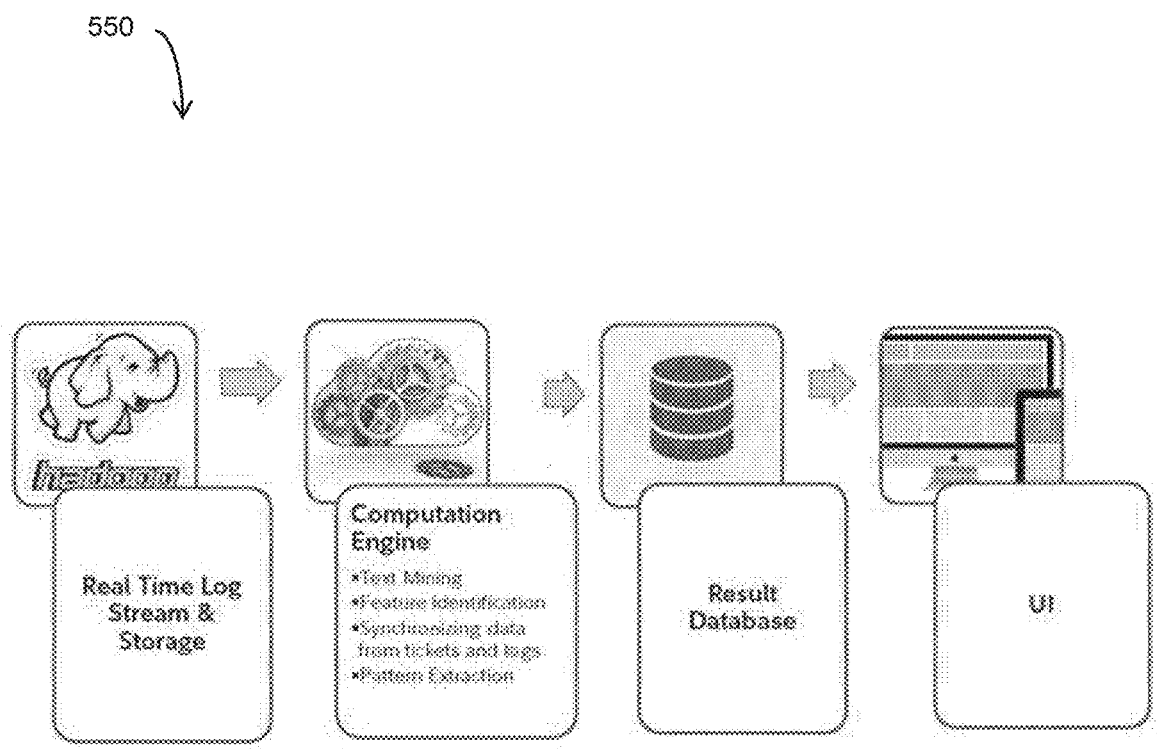

FIGS. 5A and 5B are a schematic diagrams 500, 550 of real time data flows through various components of the computing system shown and described in FIG. 1, according to illustrative embodiments of the invention. FIG. 5A shows an indicative high-level implementation of log streaming including exemplary logs (application log, system events log, system resource metrics log), beats agents (Filebeat, Winlogbeat, Metricbeat), logging and telemetry means (Apache kafka and logstash), stream pipeline (Apache Nifi), and network databases (Hadoop cluster nodes). FIG. 5B shows one high-level implementation of log reading into a prediction model, e.g., an exemplary process flow from the unstructured database to the computation engine to the result database and onto the user interface.

Figure 6:
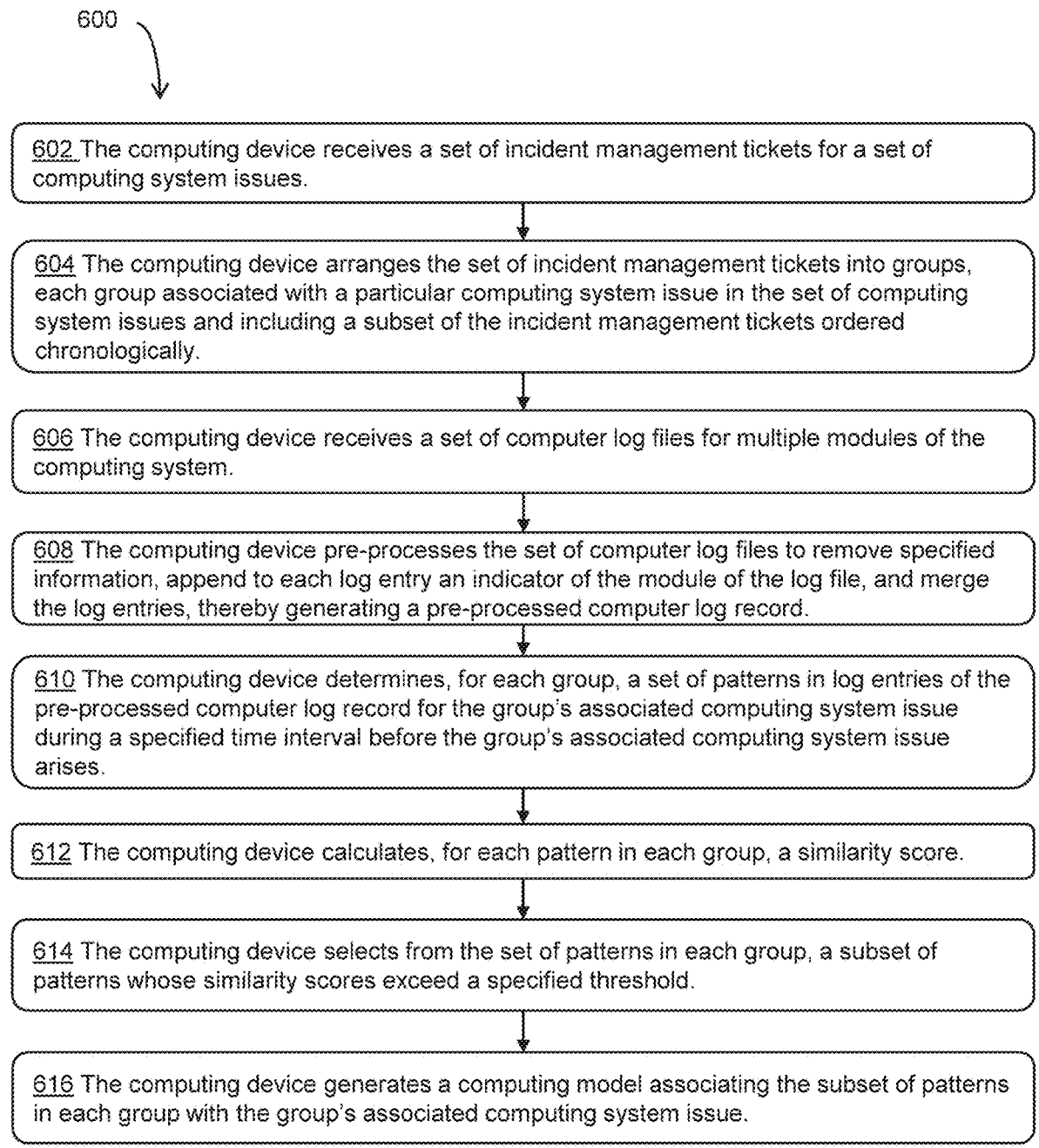
FIG. 6 is a flow chart of a method of training a computing device to predict computing system issues, according to an illustrative embodiment of the invention.

FIG. 6 is a flow chart of a method 600 of training a computing device (e.g., the computing device 104 shown and described in FIG. 1) to predict computing system issues, according to an illustrative embodiment of the invention. In a first step 602, the computing device receives a set of incident management tickets for a set of computing system issues. In a second step 604, the computing device arranges the set of incident management tickets into groups, each group associated with a particular computing system issue in the set of computing system issues and including a subset of the incident management tickets ordered chronologically. In a third step 606, the computing device receives a set of computer log files for multiple modules of the computing system. In a fourth step 608, the computing device pre-processes the set of computer log files to remove specified information, append to each log entry an indicator of the module of the log file, and merge the log entries, thereby generating a pre-processed computer log record. In a fifth step 610, the computing device determines, for each group, a set of patterns in log entries of the pre-processed computer log record for the group's associated computing system issue during a specified time interval before the group's associated computing system issue arises. In a sixth step 612, the computing device calculates, for each pattern in each group, a similarity score. In a seventh step 614, the computing device selects from the set of patterns in each group, a subset of patterns whose similarity scores exceed a specified threshold. In an eighth step 616, the computing device generates a computing model associating the subset of patterns in each group with the group's associated computing system issue.

Figure 7:
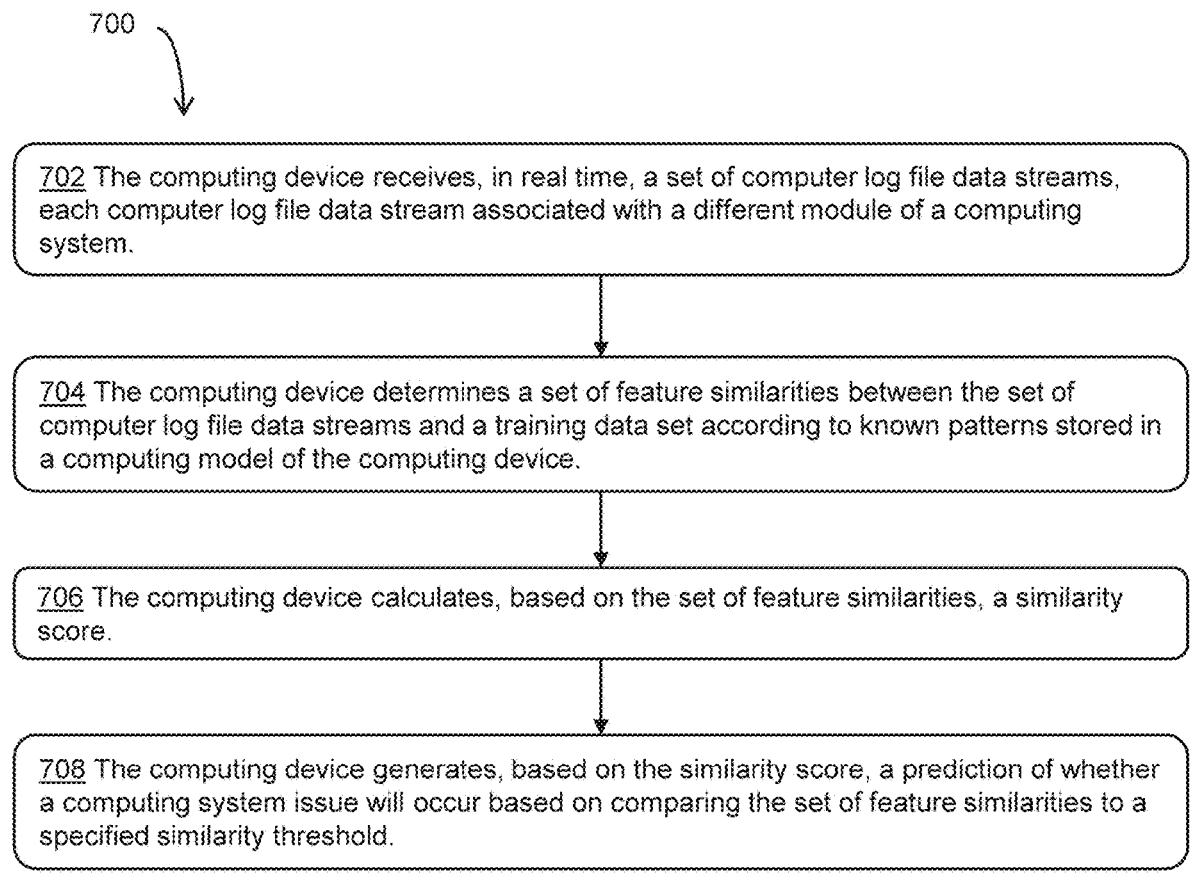
FIG. 7 is a flow chart of a method of predicting computing system issues in real time, according to an illustrative embodiment of the invention.

FIG. 7 is a flow chart of a method 700 of predicting computing system issues in real time (e.g., using the computing device 104 shown and described in FIG. 1), according to an illustrative embodiment of the invention. In a first step 702, the computing device receives, in real time, a set of computer log file data streams, each computer log file data stream associated with a different module of a computing system. In a second step 704, the computing device determines a set of feature similarities between the set of computer log file data streams and a training data set according to known patterns stored in a computing model of the computing device. In a third step 706, the computing device calculates, based on the set of feature similarities, a similarity score. In a fourth step 708, the computing device generates, based on the similarity score, a prediction of whether a computing system issue will occur based on comparing the set of feature similarities to a specified similarity threshold. In some embodiments, the computing device generates an alert and/or receives user feedback regarding whether the alert was a true alert or a false alert (e.g., the user closes the issue with an appropriate indication). In some embodiments, this feedback is processed by the computing device (e.g., through a feedback loop for self-healing or re-training the model) to improve detection of true alerts and/or reduce false alerts (e.g., when a drop in accuracy is seen).

Figure 8:
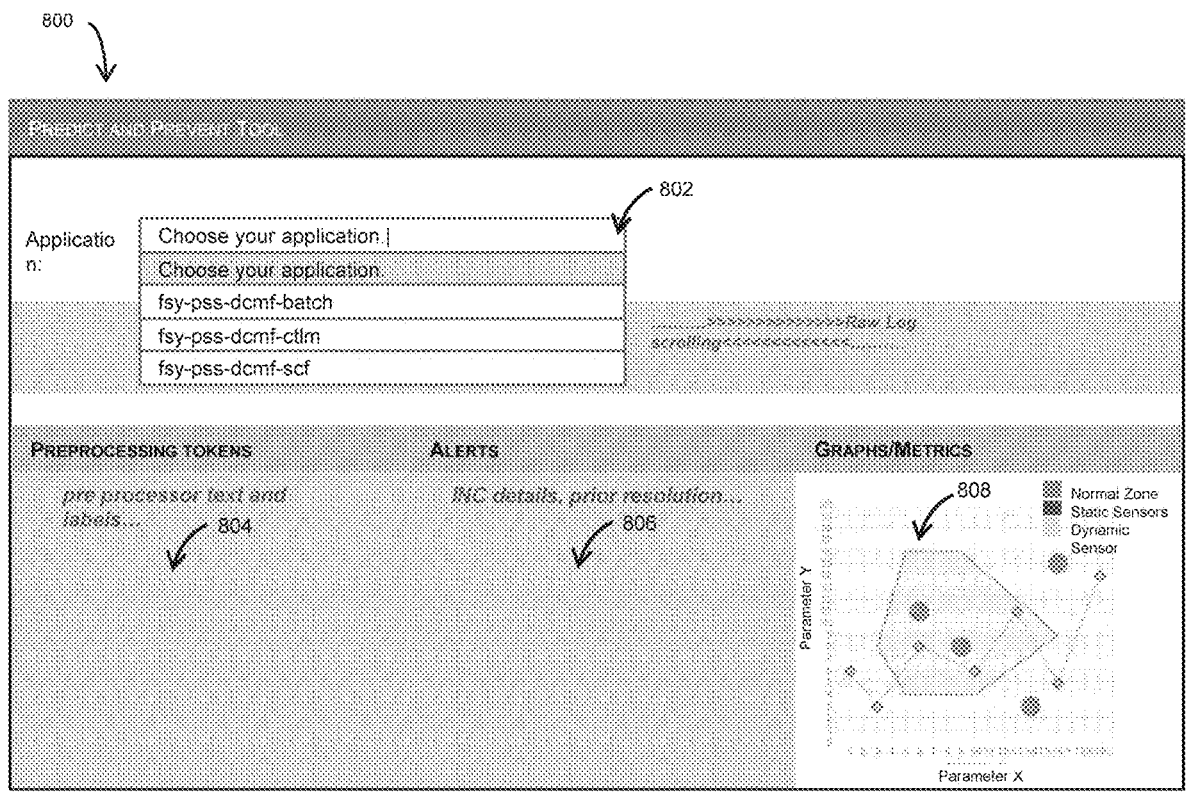
FIG. 8 is a screen shot of a user interface for a prediction and prevention tool, according to an illustrative embodiment of the invention.

FIG. 8 is a screen shot of a user interface 800 for a prediction and prevention tool, according to an illustrative embodiment of the invention. The screenshot 800 includes a text box for an application 802, a field for processing tokens 804, a field for alerts 806, and a field for graphs and/or metrics 808. The text box 802 allows the user to select a particular application of choice to see the activity instead of seeing all the parallel streams of multiple applications together. The field 804, once the user has selected the application, provides labelling of the layers along with the preprocessed text to indicate the patterns that are coming in. The field 806 is a space where the users start seeing the real-time alerts of any possible issue that might occur in future. This indicates only the issue type with a hyperlink enabled. On clicking the hyperlink the user will be able to see the details of the resolution taken in the past and what needs to be done as of the present. In some embodiments, a color of the alert indicates if the incident needs manual intervention to prevent or if the system resolve the issue. The field 808 provides metrics such as how many incidents were prevented, time saved, or the like, for more analytical reports for the users in comparison to the historic data.

Figure 9A:
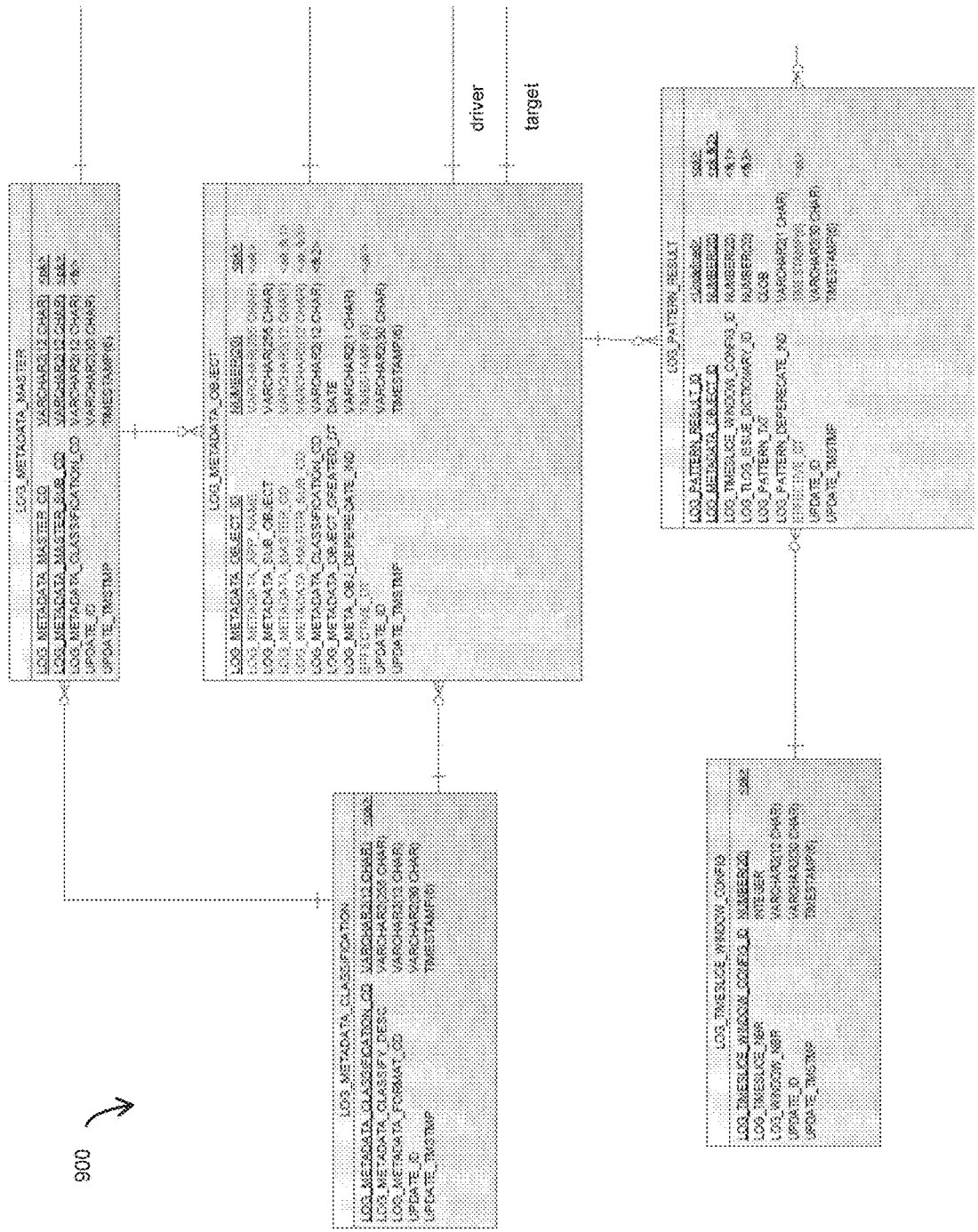
FIGS. 9A and 9B show a schematic diagram of a metadata data model, according to an illustrative embodiment of the invention.
Figure 9B:
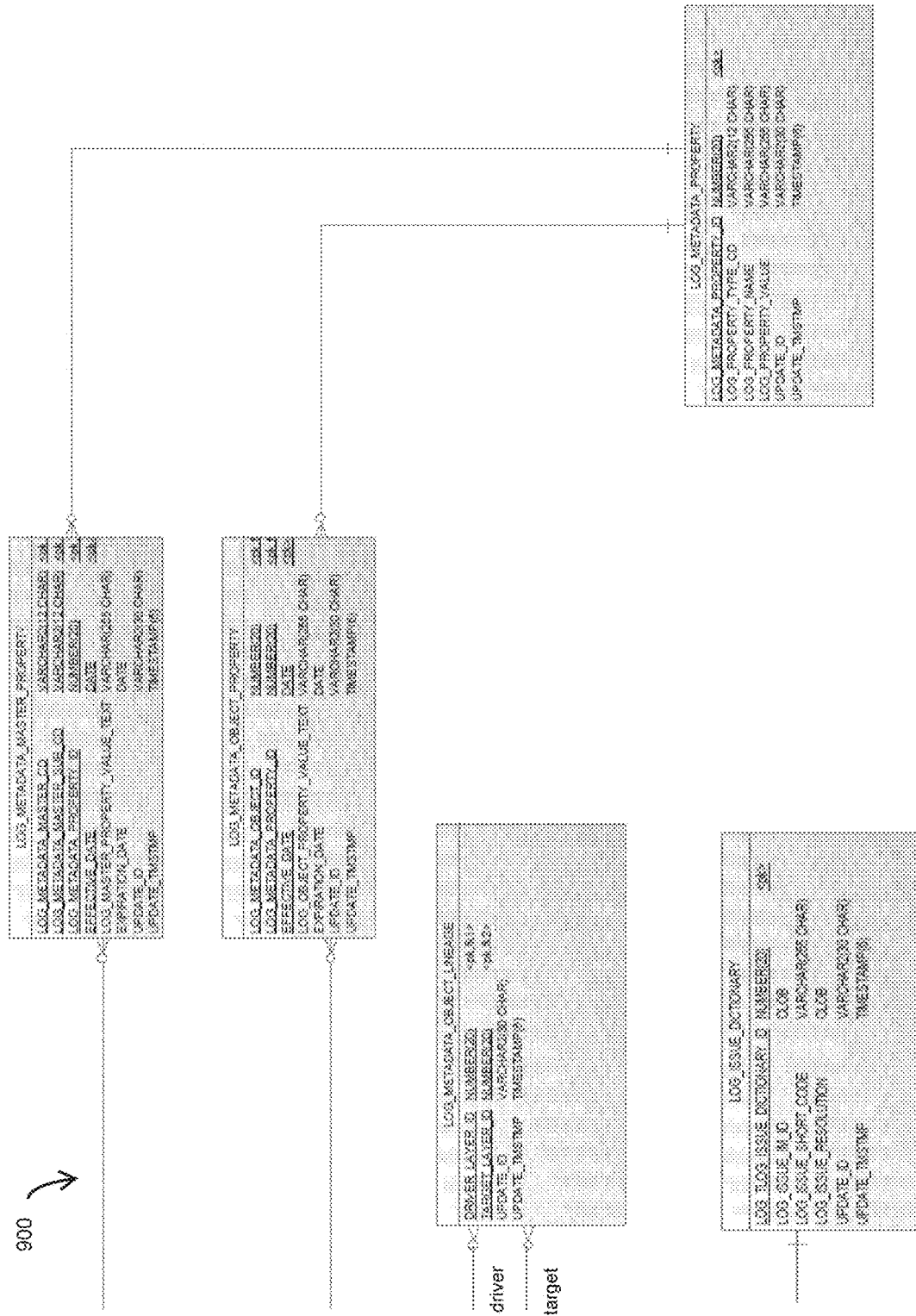

FIGS. 9A and 9B show (taken together side by side) a schematic diagram of a metadata data model 900, according to an illustrative embodiment of the invention. The model 900 shows a representation as entities and relations between the entities, as described in further detail below.

Setup Tables

LOG_METADATA_CLASSIFICATION

This table stores all the information of what type logs and their formats (for reference and building connectors) are present with in the data ecosystem. For example, for logs the classification could be: Database, Network, Application log, and the classification of these logs can be in the format of JSON, Regular, etc.

LOG_METADATA_PROPERTY

This table contains the properties of different logs. For example, for a regular text log, the new line character can define a new entry.

LOG_TIMESLICE_WINDOW_CONFIG

This table stores the number of minutes to be considered for the windowing for extracting the pattern and the slice of the window.

Main Tables

LOG_METADATA_MASTER

This table stores all the different master sources for metadata information. This includes all servers, networks and applications. For example for Database Server Log the master will contain the server details, DBName, etc.

LOG_METADATA_MASTER_PROPERTY

This table stores the properties of the master. For example if the master is an Oracle database, then it stores the physical machine name, RAC details, etc.

LOG_METADATA_OBJECT

This table stores the log information for a given master. For example, if the master is a database, then it will store the path of the log file.

LOG_METADATA_OBJECT_PROPERTY

This table stores the properties of the objects, e.g., applications to log file mapping, etc.

LOG_PATTERN_RESULT

This table stores the patterns identified and marked as the patterns that can result in an issue. These entries can be valid for a given time span during the life cycle of the application.

For a given set of servers, the patterns are extracted to define the problem causing patterns, and they are stored in the database to avoid parsing the entire log for training the model. Whenever accuracy declines, the older patterns can be decommissioned and new patterns can be registered into the system automatically, so that the system is self-governed. During the retrain process the user feedback can also looped in to improve the accuracy and reduce the occurrence of false positives.

The above-described techniques can be implemented in digital and/or analog electronic circuitry, or in computer hardware, firmware, software, or in combinations of them. The implementation can be as a robot; as a computer program product, i.e., a computer program tangibly embodied in a machine-readable storage device, for execution by, or to control the operation of, a data processing apparatus, e.g., a programmable processor, a computer, and/or multiple computers; or as both. Method steps can be performed by one or more processors executing a computer program to perform functions of the invention by operating on input data and/or generating output data.

To provide for interaction with a user, the above described techniques can be implemented on a computing device in communication with a display device, e.g., a plasma or LCD (liquid crystal display) monitor or a mobile computing device display or screen for displaying information to the user and a keyboard and a pointing device, e.g., a mouse, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

In some embodiments, software elements used include Python (e.g, Python 3.6), Hadoop distribution, and/or PyQT. In some embodiments, hardware elements used include a computing system and Hadoop cluster nodes. In some embodiments, data sources used including databases storing customer chat interactions phone transcripts, and/or web search queries.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A method of training a computing device to predict and prevent computing system issues, the method comprising:
   receiving, by the computing device, a set of incident management tickets for a set of computing system issues, each incident management ticket including a time stamp;
   arranging, by the computing device, the set of incident management tickets into groups, each group associated with a particular computing system issue in the set of computing system issues and including a subset of the incident management tickets ordered chronologically according to their time stamps;
   receiving, by the computing device, a set of computer log files for multiple modules of the computing system, each entry in the computer log files including a time stamp;
   pre-processing, by the computing device, the set of computer log files to remove specified information, append to each log entry an indicator of the module of the log file, merge the log entries and sort the log entries by time stamp, thereby generating a pre-processed computer log record;
   determining, by the computing device, for each group, a set of patterns in log entries of the pre-processed computer log record for the group's associated computing system issue during a specified time interval before the group's associated computing system issue arises;
   calculating, by the computing device, for each pattern in each group, a similarity score;
   selecting, by the computing device, from the set of patterns in each group, a subset of patterns whose similarity scores exceed a specified threshold; and generating, by the computing device, a computing model associating the subset of patterns in each group with the group's associated computing system issue.

2. The method of claim 1 further including storing, by the computing device, the computing model including the patterns in each group in a database in electronic communication with the computing device.

3. The method of claim 1 wherein the computing model includes at least one of structured features from the log files, meta information from the log files, and trained data set information for one or more types of computing system issues.

4. The method of claim 1 wherein the computer log files are heterogeneous and include unstructured data.

5. The method of claim 1 wherein the multiple modules of the computing system include a database having an associated database log, a network having an associated network log, and an application having an associated application log.

6. The method of claim 1 wherein pre-processing the set of computer log files to remove specified information includes removing special characters.

7. The method of claim 1 wherein determining each pattern in the set of patterns includes using a KNN algorithm, a naïve Bayes classifier, a random forest classifier, or another clustering technique.

8. The method of claim 1 wherein calculating the similarity score includes using a KNN algorithm, a random forest classifier, or a tf-idf classifier followed by cosine similarity.

9. The method of claim 1 wherein calculating the similarity score includes using a competitor and challenger model.

10. The method of claim 1 further including incorporating, by the computing device, feedback regarding incident management ticket closure into the computing model to improve pattern recognition by the computing model.

11. The method of claim 1 wherein the incident management tickets are received from an incident ticketing system database.

12. The method of claim 1 wherein determining the set of patterns for each group during a specified time interval includes using a combination of time slicing and windowing techniques, the computing device: (i) executing the computing model for a number of combinations of different time slices and windows; (ii) computing an accuracy percentage for each combination; and (iii) selecting the combination having the highest accuracy defined by combinations selected based on a highest match in matrix that has maximum similarity score and highest features matching.

13. The method of claim 12 wherein the specified time interval is between 5 and 90 minutes.

14. The method of claim 1 further including: (i) receiving, by the computing device, real time log streaming data; and (ii) labeling, by the computing device, each log entry with an indicator of the layer of the log to apply the computing model to predict a real-time issue.

15. The method of claim 1 wherein the specified threshold for similarity scores is between 80% and 90%.

16. A method of predicting computing system issues in real time, the method comprising:
  receiving, by a computing device, in real time, a set of multiple computer log file data streams, each computer log file data stream associated with a different module of a computing system;
  determining, by the computing device, a set of feature similarities between the set of computer log file data streams and a training data set according to known patterns stored in a computing model of the computing device, the training data set reflecting a set of patterns in log entries having time stamps within a specified time interval before a computing system issue arises;
  calculating, by the computing device, based on the set of feature similarities, a similarity score; and
  generating, by the computing device, based on the similarity score, a prediction of whether the computing system issue will occur based on comparing the set of feature similarities to a specified similarity threshold.

17. The method of claim 16 further including generating, by the computing device, a correlation matrix including comparisons between historic computer log patterns of different computing modules and the computer log file data streams.

18. The method of claim 17 further including determining, by the computing device, how a particular computing module is impacting other computing modules of the computing system using the correlation matrix.

19. The method of claim 16 further including generating, by the computing device, for any computing system issue that is detected, an incident ticketing system ticket.

20. The method of claim 19 further including refining, by the computing device, the computing model based on eventual resolution of the incident ticketing system ticket.

21. The method of claim 16 further including identifying, by the computing device, for a new incident management ticket that has not occurred previously, a pattern similar to one or more known patterns stored in the computing model using a clustering method based on the set of feature similarities.

22. The method of claim 16 further including determining, by the computing device, whether the computing issue is indicative of a false alarm by comparing a similarity score of the new incoming log with existing patterns and if none of the patterns matches above a predetermined threshold it is deemed a safe log.

23. A computerized system for training a computing device to predict computing system issues for a computing system having multiple modules, the computerized system including:
  a computing device configured to:
    receive a set of incident management tickets for a set of computing system issues, each incident management ticket including a time stamp;
    arrange the set of incident management tickets into groups, each group associated with a particular computing system issue in the set of computing system issues and including a subset of the incident management tickets ordered chronologically according to their time stamps;
    receive a set of computer log files for multiple modules of the computing system, each entry in the computer log files including a time stamp;
    pre-process the set of computer log files to remove specified information, append to each log entry an indicator of the module of the log file, merge the log entries, and sort the log entries by time stamp, thereby generating a pre-processed computer log record;
    determine, for each group, a set of patterns in all log entries of the pre-processed computer log record for the group's computing system issue during a specified time interval before the group's computing system issue arises;
    calculate, for each pattern in each group, a similarity score;

select, from the set of patterns in each group, a subset of patterns whose similarities scores exceed a specified threshold; and generate, a computing model associating the subset of patterns in each group with the computing system issue.

24. The system of claim 23 further including a database in electronic communication with the computing device, the database storing the computing model including the patterns in each group.

25. The system of claim 23 further including an incident ticketing system database in electronic communication with the computing device, the incident ticketing system database for providing incident management tickets to the computing device.

26. The system of claim 23 wherein the multiple modules of the computing system include a database having an associated database log, a network having an associated network log, and an application having an associated application log.

27. A computerized system for predicting computing system issues in real time for a computing system having multiple modules, the computerized system including:

a computing device configured to:

receive in real time a set of multiple computer log file data streams, each computer log file data stream associated with a different module of a computing system;

determine a set of feature similarities between the set of computer log file data streams and a training data set according to known patterns stored in a computing model of the computing device, the training data set reflecting a set of patterns in log entries having time stamps within a specified time interval before a computing system issue arises;

calculate, based on the set of feature similarities, a similarity score; and generate, based on the similarity score, a prediction of whether the computing system issue will occur based on comparing the set of feature similarities to a specified similarity threshold.

28. The system of claim 27 further including a database in electronic communication with the computing device, the database storing the computing model including the patterns in each group.

29. The system of claim 27 further including an incident ticketing system database in electronic communication with the computing device, the incident ticketing system database for providing incident management tickets to the computing device.

30. The system of claim 27 wherein the multiple modules of the computing system include a database having an associated database log, a network having an associated network log, and an application having an associated application log.

* * * * *